US012711862B2

(12) United States Patent
Abdallah et al.

(10) Patent No.: US 12,711,862 B2
(45) Date of Patent: Aug. 18, 2026

(54) METHOD FOR ALERTING DRIVERS OF ELEVATIONAL BARRIERS

(71) Applicants: Raef Abdallah, West Bloomfield, MI (US); Weisong Shi, Wilmington, DE (US)

(72) Inventors: Raef Abdallah, West Bloomfield, MI (US); Weisong Shi, Wilmington, DE (US)

(73) Assignee: Raef Abdallah, West Bloomfield, MI (US)

( * ) Notice: Subject to any disclaimer, the term of this patent is extended or adjusted under 35 U.S.C. 154(b) by 4 days.

(21) Appl. No.: 18/887,337

(22) Filed: Sep. 17, 2024

(65) Prior Publication Data

US 2026/0080776 A1 Mar. 19, 2026

(51) Int. Cl.
*G08G 1/0967* (2006.01)

(52) U.S. Cl.
CPC .................................. *G08G 1/0967* (2013.01)

(58) Field of Classification Search
None
See application file for complete search history.

(56) References Cited

U.S. PATENT DOCUMENTS

| | | | | |
|---|---|---|---|---|
| 11,029,390 | B2 * | 6/2021 | Fath | G01S 7/4026 |
| 11,840,241 | B1 * | 12/2023 | Barrett | B60W 40/101 |
| 2020/0269633 | A1 * | 8/2020 | Downey | B60B 29/00 |
| 2023/0153766 | A1 * | 5/2023 | Thoele | G06Q 40/08 705/4 |
| 2024/0159548 | A1 * | 5/2024 | Grimm | G01C 21/3461 |
| 2024/0212496 | A1 * | 6/2024 | Xu | B60K 35/85 |
| 2024/0223895 | A1 * | 7/2024 | Haas | H04N 7/188 |
| 2024/0404409 | A1 * | 12/2024 | Nugent | G08G 1/161 |
| 2025/0147187 | A1 * | 5/2025 | Sarwar | G01S 7/4817 |
| 2025/0217349 | A1 * | 7/2025 | Nugent | G08G 1/161 |

FOREIGN PATENT DOCUMENTS

| | | | | | |
|---|---|---|---|---|---|
| CN | 111169315 | A * | 5/2020 | | B60L 53/38 |
| CN | 113405818 | A * | 9/2021 | | G01B 21/08 |
| CN | 217460370 | U * | 9/2022 | | |

OTHER PUBLICATIONS

R. Abdallah and W. Shi, "SafeOverPass: An Edge-Based Low-Clearance Overpass Warning System," 2021 Fourth International Conference on Connected and Autonomous Driving (MetroCAD), Detroit, MI, USA, 2021, pp. 17-22, doi: 10.1109/MetroCAD51599.2021.00012.

* cited by examiner

*Primary Examiner* — Fekadeselassie Girma
(74) *Attorney, Agent, or Firm* — Simonelli IP, PLLC

(57) ABSTRACT

A method generates a warning that a total vehicle height of a vehicle may exceed a clearance height of a road. The method begins with identifying the total vehicle height. The method then downloads the clearance height of all roads proximal to the vehicle. The vehicle height is compared to the clearance heights downloaded. A warning is generated when the step of comparing identifies at least one clearance height that is less than the vehicle height.

7 Claims, 5 Drawing Sheets

METHOD FOR ALERTING DRIVERS OF ELEVATIONAL BARRIERS

BACKGROUND ART

1. Field of the Invention

This invention relates generally to a method for alerting drivers of obstructions. More particularly, this invention relates to a method for alerting drivers of obstructions spaced vertically from the driving surface.

2. Description of the Related Art

Tall vehicles hitting obstructions vertically (collectively referred to hereinafter as "overpasses") is a common problem that occurs when vehicles, typically trucks or buses, exceed the height clearance of an overpass. This can result in significant damage to both the vehicle and the overpass. This type of accident is both frequent and costly.

There are several reasons why vehicles may collide with overpasses. Drivers misjudge the height of their vehicle or the clearance of the overpass, especially if they are unfamiliar with the route or if the signage indicating the clearance height is not clearly visible. In some situations, drivers may not have accurate information about the height of their vehicle, particularly if they are operating a rented or borrowed vehicle and are not familiar with its specifications. Errors in navigation systems or GPS devices can sometimes lead drivers onto routes with low clearance without adequate warning. Distractions such as mobile phones, navigation devices, or passengers can divert a driver's attention from road signs or warnings about low clearance. In some instances, a driver may ignore or fail to notice warning signs indicating low clearance ahead, especially if they are focused on navigating traffic or other aspects of driving. If a tall vehicle is carrying a load that exceeds the vehicle's usual height, such as oversized equipment or cargo stacked too high, it may increase the risk of collision with overpasses.

SUMMARY OF THE INVENTION

A method generates a warning that a total vehicle height of a vehicle may exceed a clearance height of a road. The method begins with identifying the total vehicle height. The method then downloads the clearance height of all roads proximal to the vehicle. The vehicle height is compared to the clearance heights downloaded. A warning is generated when the step of comparing identifies at least one clearance height that is less than the vehicle height.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
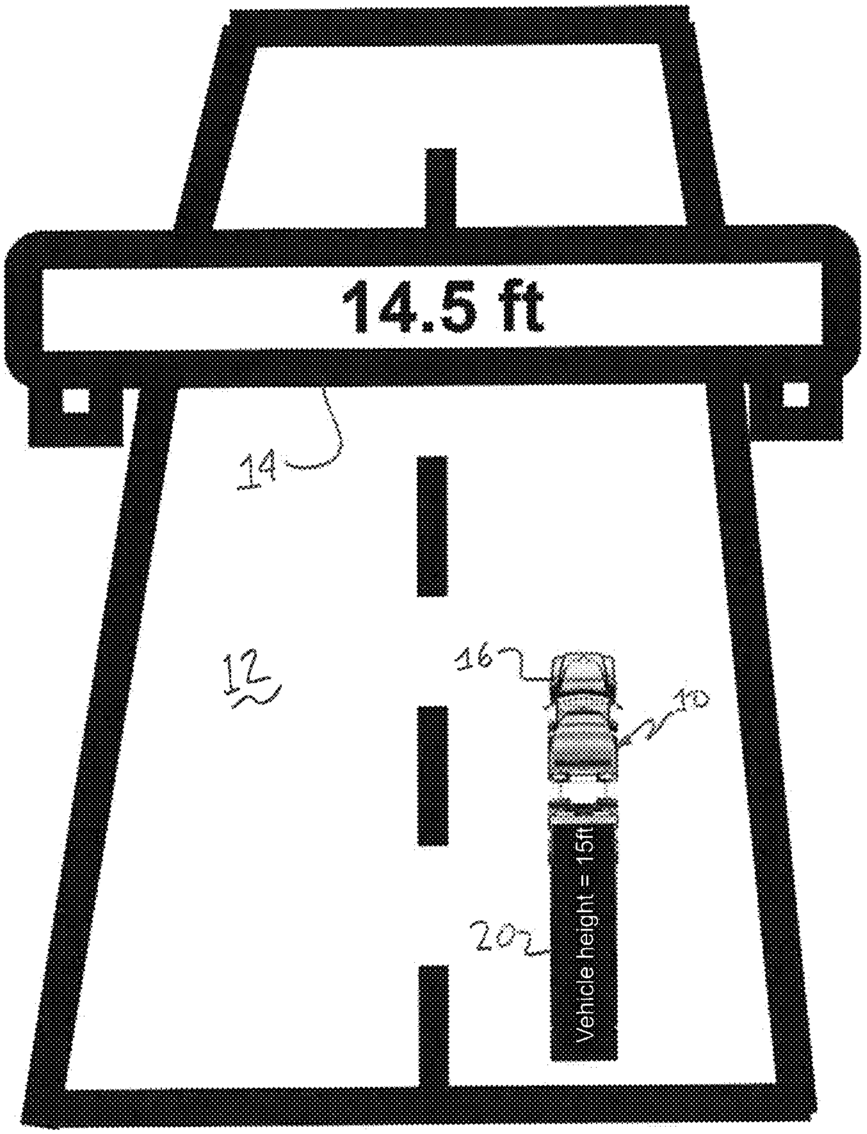
FIG. 1 is a graphical representation of a perspective view of a vehicle on a road approaching an obstruction vertically disposed with respect to the road surface.

Referring to FIG. 1, a vehicle, generally shown at 10, is shown on a road surface 12 with an obstruction 14 spaced vertically with respect to the road surface 12. While the vehicle 10 is shown to be a truck 16 and trailer 20, it should be appreciated by those skilled in the art that the vehicle 10 may be any vehicle 10 driving on the road surface 12. And while the obstruction 14 is shown to be an overpass, it should be appreciated by those skilled in the art that any obstruction vertically positioned over the road surface 12 can be an issue that a method for warning the driver, discussed subsequently, can identify and warn as being a potential hazard to continue driving down the road surface 12.

Figure 2:
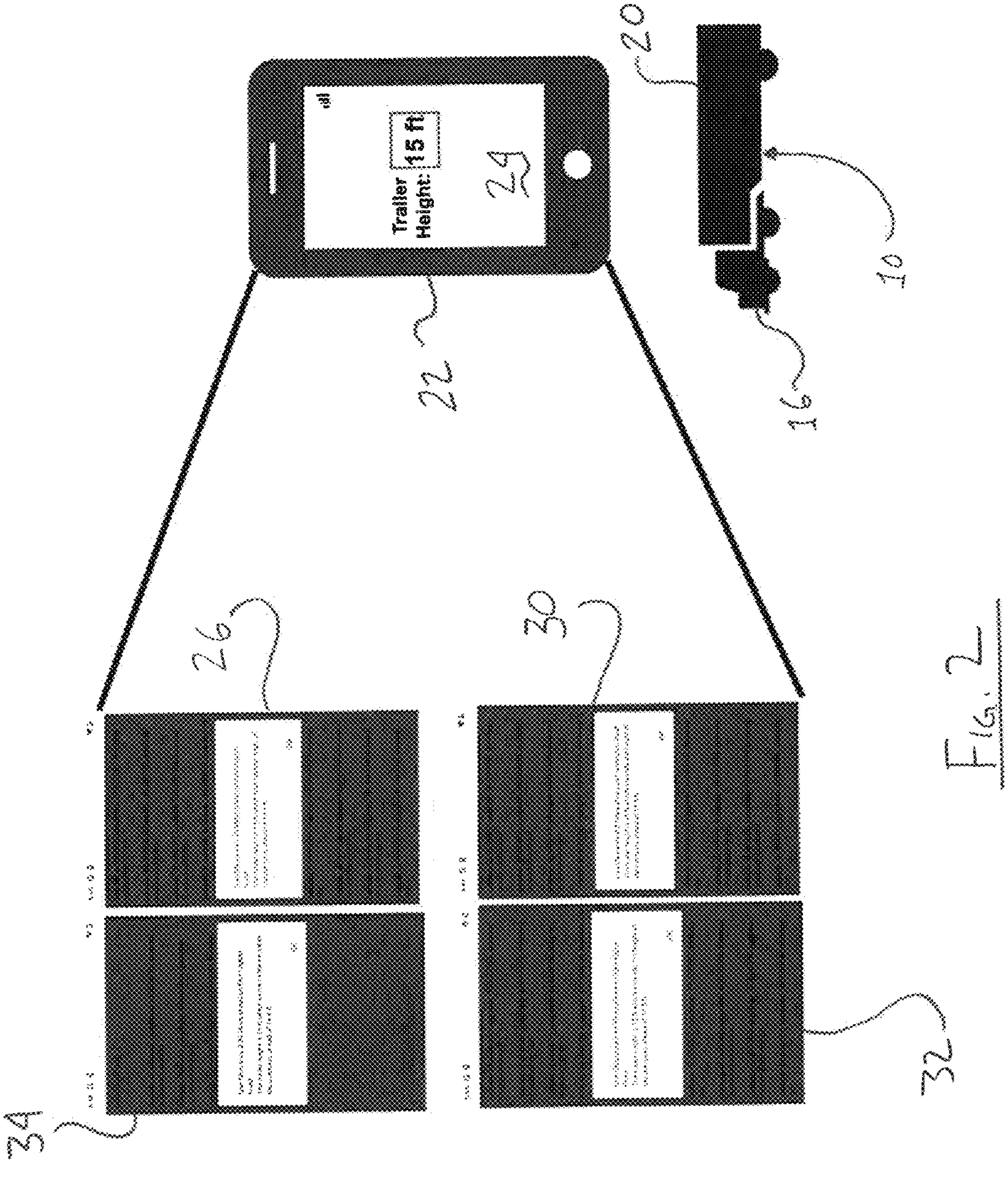
FIG. 2 is a graphic representation of a smart phone in a vehicle and screen shots of various messages displayed on the smart phone relating to the method described herein.

Referring to FIG. 2, a smart phone 22 is shown to be inside the truck 16. The smart phone 22 may be any electronic communication device, such as an electronic tablet, laptop, or even a dedicated aftermarket device to be installed as permanent or semi-permanent vehicle equipment. The smart phone 22 is shown to have five screen outputs 24, 26, 30, 32, 34. The first screen output 24 shows the height of the trailer 20 as being 15 feet. This is an exemplary height. The other screen outputs 26, 30, 32, 34 show texts warnings that an obstruction 14 may need to be avoided based on the height of the obstruction 14 and that of the either the truck 16 or the trailer 20, or both. As the vehicle 10 moves closer to an obstruction 14, the warnings may change background color or the system may make sounds, alarms or textual, to further gain the attention of the operator of the vehicle. 10.

Figure 3:
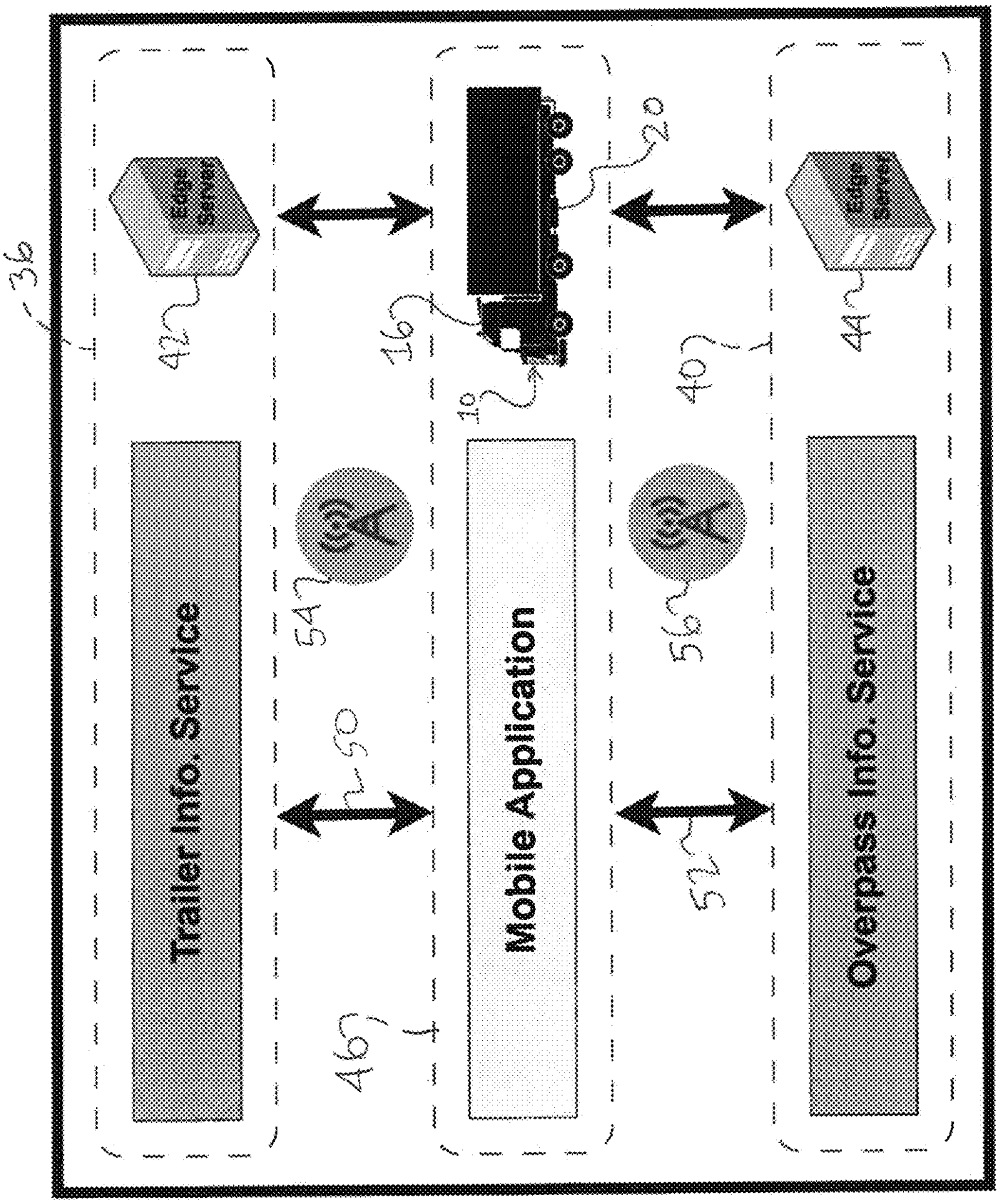
FIG. 3 is a block diagram showing the structural transmission of data between various elements related to the method described herein.

Referring to FIG. 3, an exemplary architecture is graphically represented. The vehicle 10 communicates between two systems, the travel information service 36 and the overpass information service 40. Each of these services 36, 40 may be hosted on edge servers 42, 44, respectively. It should be appreciated by those skilled in the art that any type of server, either dedicated or a portion of a larger commercial server service, may be used in place of the edge servers 42, 44. The trailer information service 36 is a database that may provide information regarding the height of the trailer 20 if the information regarding the trailer 20 had been provided to the trailer information service 36. The trailer information service 36 may include data from manufacturers, fleet owners, and/or individual owners of the trailers 20. In some situations, such as when the owner of the trailer 20 owns a fleet of trailers 20, it may be that vehicle heights may be incorporated into the trailer information service 36 in a manner in which the parameters are linked to vehicle identification numbers (VINs).

The overpass information service 40 will provide data relating to the location and height that particular overpasses exist with respect to the road surface 12 over which the obstruction 14 extends. The location data will be given in terms of longitudinal and latitudinal coordinates. This data can be compiled by the various governments and/or agencies that have responsibility for their construction and maintenance.

Each of these two services 36, 40 may provide data to the mobile application 46 electronically, as is graphically represented by arrows 50, 52 and antennas 54, 56. The arrows 50, 52 are bidirectional showing that the mobile application 46 is capable of sending data (e.g., requests) to each of the services 36, 40. One reason why the mobile application 46 may need to communicate with the overpass information service 40 is because it may need to update the overpass height data needed due a route change.

Figure 4:
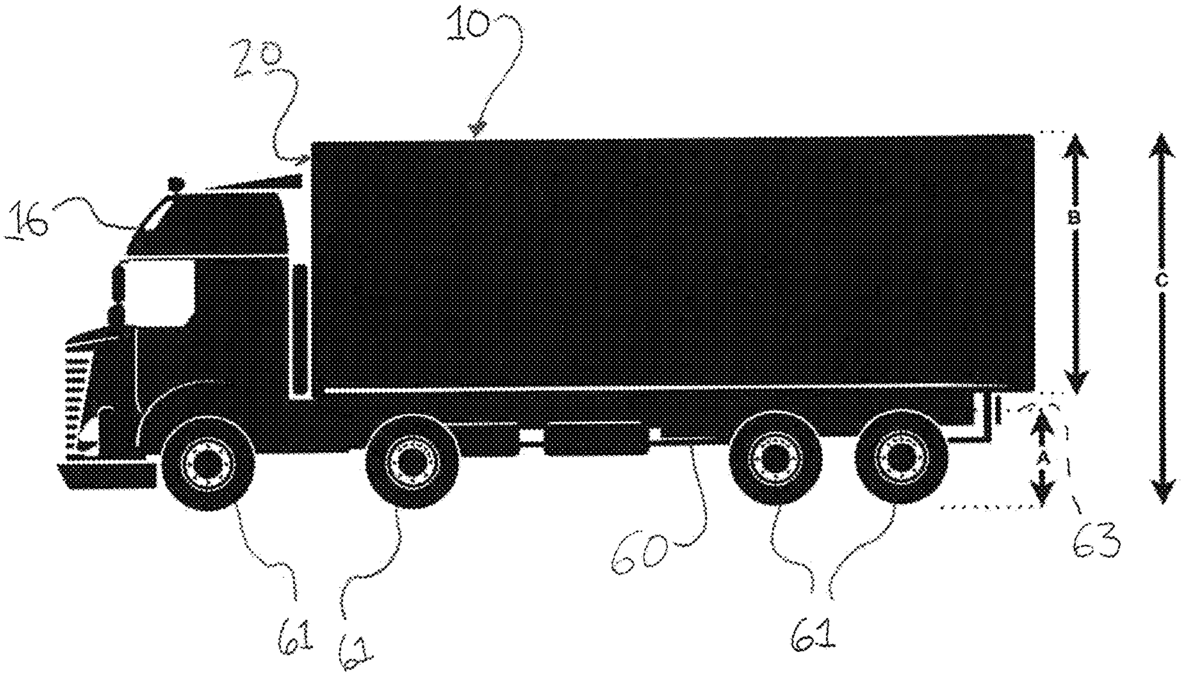
FIG. 4 is a side view of a vehicle.

Referring to FIG. 4, a side view of the vehicle 10 is shown. Typically, the truck 16 has a smaller profile than the trailer 20 so the height of the trailer 20 is important to capture. However, it should be appreciated that the height of the truck 16 is important, especially when it is being used sans the trailer 20.

A tire diameter A and a trailer height B are combined to create a total vehicle height C. The tire diameter A may be measured directly, or it may be identified by scanning the tire sidewall (not specifically shown in the Figures). There may be an overlap between the where the tire diameter stops and where the trailer profile starts. The method, discussed in greater detail below, will automatically adjust for this because it will know the distance between a bottom 60 of the trailer 20 and a distance from it to its wheel axles (not shown). And based on the wheel/tire information input, it will be able to calculate how much overlap, positive overlap or negative overlap, there is between the trailer 20 and the wheel 61. By way of example, FIG. 4 shows a negative overlap in that the bottom 60 of the trailer 20 is spaced apart from a top of the wheel 61, graphically represented by a dashed line 63. In another example, such as a horse trailer (not shown), a bottom of a trailer will be substantially below a top of the wheels for the trailer.

Figure 5:
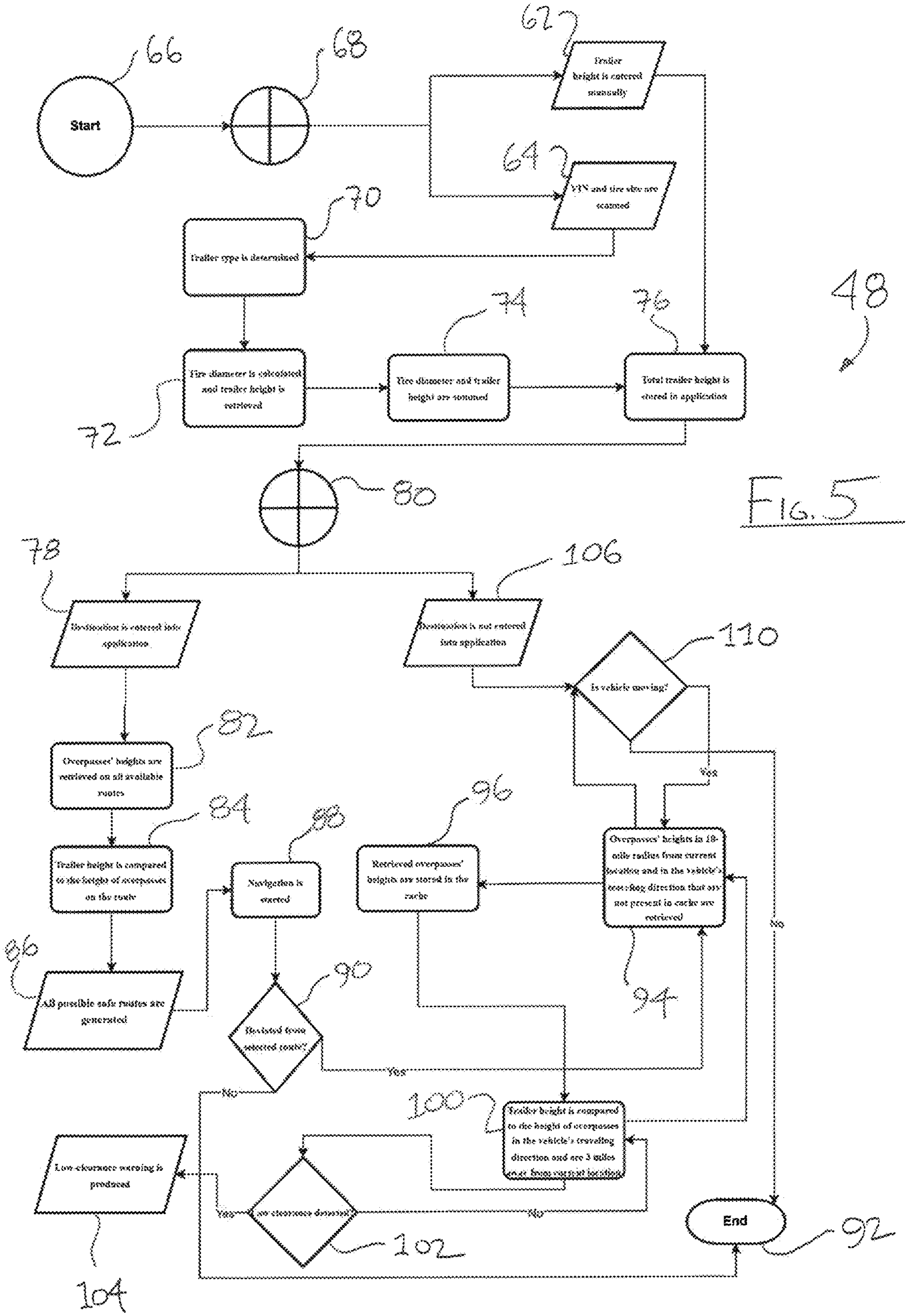
FIG. 5 is flowchart illustrating one embodiment of the method.

The mobile application 46 is a method 48 graphically shown as a flowchart in FIG. 5. The mobile application 46 is a method 48 for generating a warning that a total vehicle height C of the vehicle 10 may exceed a clearance height of a road as defined by the distance between the road surface 12 and the obstruction 14. The method 48 begins at 66 by identifying the total vehicle height C. As stated above, it can do this by manually entering the data at 62, or by calculating the total vehicle height C through identification of the truck 16, or the trailer 20, and the tire size, graphically represented by its diameter A at 64. The OR symbol 68 represents that either method for obtaining the total vehicle height C is acceptable. It should be appreciated by those skilled in the art that the height C of the trailer 20 may have to be entered manually if the trailer 20 has been modified. By way of example, a trailer 20 may be modified to include a refrigeration unit (not shown) on the top thereof. Additions like these will have to be recognized and manually entered for the method 48 to identify the routes properly.

The method 48 then determines the type of trailer 20 at 70. If the vehicle data is derived by inputting identification information, such as a VIN, the trailer height B and the tire diameter A are retrieved at 72. The tire diameter and the vehicle height B are entered into a formula based on the relationship of where the trailer 20 sits with respect to the wheel 61. In the embodiment shown in FIG. 5, the formula is to sum the trailer height B and the tire diameter A to come up with the total vehicle height C, which is then stored by the mobile application 46 at 76. In one embodiment, the method 48 adds a factor to the total vehicle height C to add a buffer to the overall calculation of whether an overpass is going to be an obstruction or not. In one embodiment, the factor is an additional five percent of the total vehicle height C (or 1.05C).

The method 48 then downloads clearance heights of all roads proximal to the vehicle 10. The method 48 does this by using GPS data. This GPS data can be combined with the entry of destination data 78 or just identifying clearance heights proximal to the vehicle 10. The OR symbol 80 represents that the clearance data may either be the proximal data or the proximal data highlighted by the expected routes being taken to reach a desired destination. More specifically, the user of the method 48 may either enter a destination at 78 or the method proceeds to retrieve information proximal to the current location of the 10, at 106, discussed in greater detail subsequently.

If the destination is entered at 78, the method 48 then retrieves at 82 all overpass heights of the likely routes needed for the vehicle 10 to reach its destination. The total vehicle height C is then compared at 84 to all the heights of the overpasses 14 on all of the routes. The method 48 then generates all the possible routes that could be taken at 86 that are deemed to not pose an elevational issue by the method 48.

Navigation begins at 88. The method 48 continually watched the route taken. It determines at 90 whether the vehicle 10 has deviated from the route selected. If not, the method 48 continues until the route is completed and the method 48 concludes at 92.

If it is determined at 90 that a deviation has occurred, the method 48 downloads all overpass heights within a radius of the vehicle 10 at 94. In one embodiment, the radius is ten miles. The information regarding the overpasses is stored in cache at 96. The height C of the trailer 20 is then compared to the overpass heights in the direction the vehicle 10 is traveling out a predetermined distance at 100. In one embodiment, the method 48 looks out three miles in the direction of travel.

If low clearance is detected at 102, a low-clearance warning is produced at 104. This warning can be audible, visual, haptic or any combination of the three. The warning will continue to be produced as long as a low clearance overpass is within the prescribed forward direction.

Returning attention to the option to enter a destination or not (step 80), if a destination is not entered, as determined by step 106, the method 48 determines whether the vehicle 10 is moving at 110. If it is not, the method 48 terminates at 92. If the method 48 determines the vehicle 10 is moving, it checks the overpass heights within a ten mile radius at 94. The method continues to step 96 and beyond as described above.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for generating a warning that a total vehicle height of a vehicle may exceed a clearance height of a road being executed by a mobile application on an electronic communication device carried in the vehicle, the method comprising the steps of:

identifying the total vehicle height;

receiving GPS data indicative of a current location of the vehicle;

inputting a destination input of the vehicle;

retrieving, using the GPS data and the destination input, overpass height data for likely routes needed for the vehicle to reach the destination;

downloading the clearance height of all roads proximal to the vehicle;

comparing the total vehicle height to the overpass height data clearance heights using the overpass height data downloaded;

generating one or more possible routes that are deemed not to pose an elevational issue based on the step of comparing;

beginning navigation on one of the one or more possible routes;

determining whether the vehicle has deviated from the one of the one or more possible routes;

producing a deviated route;

downloading the clearance height of all roads proximal to the vehicle along the deviated route;

comparing the total vehicle height to overpass heights along the deviated route; and generating a warning when the step of comparing identifies at least one clearance height that is less than 105% of the total vehicle height.

2. A method as set forth in claim 1 wherein the step of identifying the vehicle height includes a step of entering the vehicle height into the electronic communication device manually.

3. A method as set forth in claim 1 wherein the step of identifying the vehicle height by entering a vehicle identification number for the vehicle and a size of a tire mounted to the vehicle.

4. A method as set forth in claim 1 wherein the step of identifying the vehicle height includes the step of scanning identifying information on the vehicle using the electronic communications device.

5. A method as set forth in claim 4 including a step of retrieving a vehicle height from a database associated with the vehicle identification number.

6. A method as set forth in claim 5 including a step of calculating a tire diameter based on the tire size.

7. A method as set forth in claim 6 including a step of adding the tire diameter and the vehicle height to obtain the total vehicle height.

* * * * *